United States Patent [19]

Kondo et al.

[11] 4,283,644
[45] Aug. 11, 1981

[54] DC MOTOR

[75] Inventors: Masayuki Kondo, Kashiwa; Yoshio Kishi, Hachiouji, both of Japan

[73] Assignee: Sony Corporation, Tokyo, Japan

[21] Appl. No.: 77,180

[22] Filed: Sep. 20, 1979

[30] Foreign Application Priority Data

Sep. 22, 1978 [JP] Japan ............................. 53-117196

[51] Int. Cl.³ .......................................... H02K 11/00
[52] U.S. Cl. ................................. 310/68 R; 310/268; 318/254
[58] Field of Search ....................... 310/68, 268, 156; 318/254, 138

[56] References Cited

U.S. PATENT DOCUMENTS

| 3,867,656 | 2/1975 | Mitsui et al. ............... 310/268 X |
| 3,891,905 | 6/1975 | Müller ......................... 310/268 X |
| 4,093,882 | 6/1978 | Furuta ......................... 310/268 |
| 4,109,170 | 8/1978 | Fujita et al. ................ 310/268 X |
| 4,143,288 | 3/1979 | Sato ............................ 310/68 R X |
| 4,164,690 | 8/1979 | Müller et al. ............... 318/254 |

*Primary Examiner*—Donovan F. Duggan

*Attorney, Agent, or Firm*—Lewis H. Eslinger; Alvin Sinderbrand

[57] ABSTRACT

A brushless DC motor includes a permanent field magnet secured to a rotor and having a radially directed annular surface, and two phase coil elements in the form of a sectorial loop secured to a stationary stator and disposed in a plane parallel to the annular magnet surface, the loop having circumferentially extending portions which are in inner and outer relation in respect to the center of the annular magnet surface, with the magnet and each coil element being relatively rotatable about the axis of the rotor. The mean radial distance f between the inner and outer circumferentially extending portions of each coil element and the radial width b of the annular surface of the magnet are selected as that the ratio b/f is within the range of 0.8 to 1.2 for maximizing the viscosity factor $\mu$ of the motor. In addition to providing the above ratio within the stated range or as an alternative thereto, the mechanical viscosity factor $\mu$ can be maximized by providing a reduced air gap $d' = \sqrt{2}d/\sqrt{ab}$, in which a is the mean radius of the magnet, d is the size of the air gap between the annular magnet surface and the stator, and d' has a value within the range of 0.15 to 0.30.

19 Claims, 14 Drawing Figures

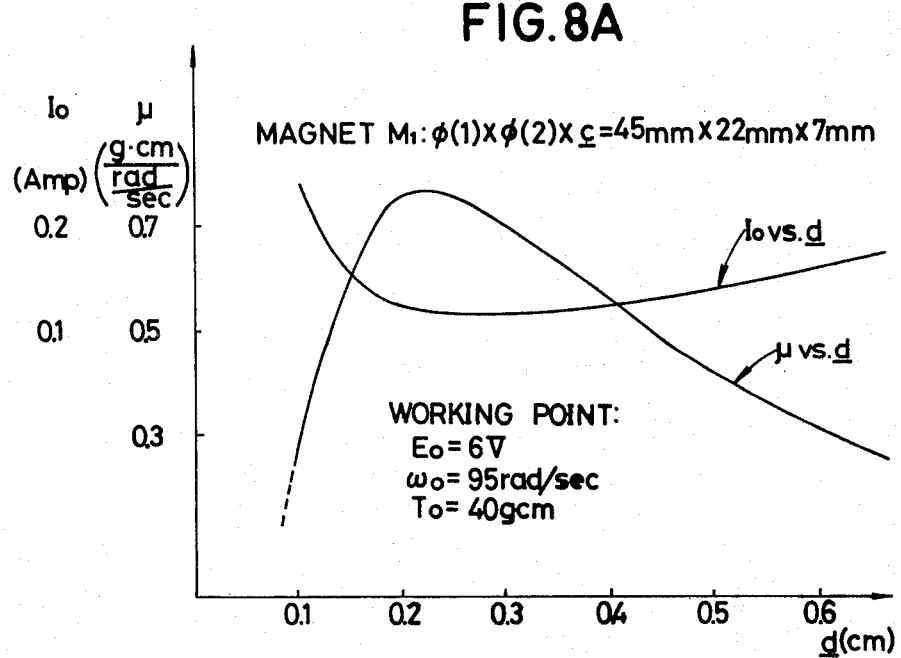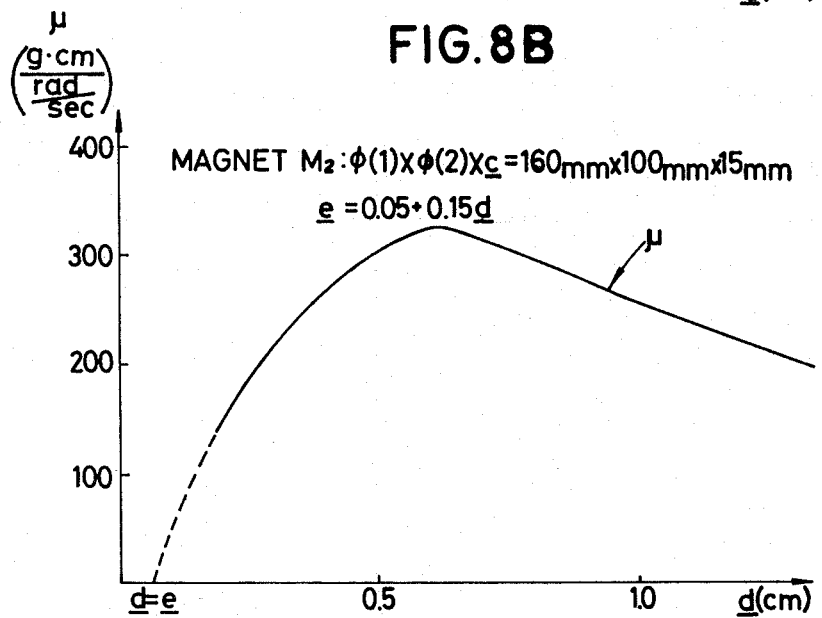

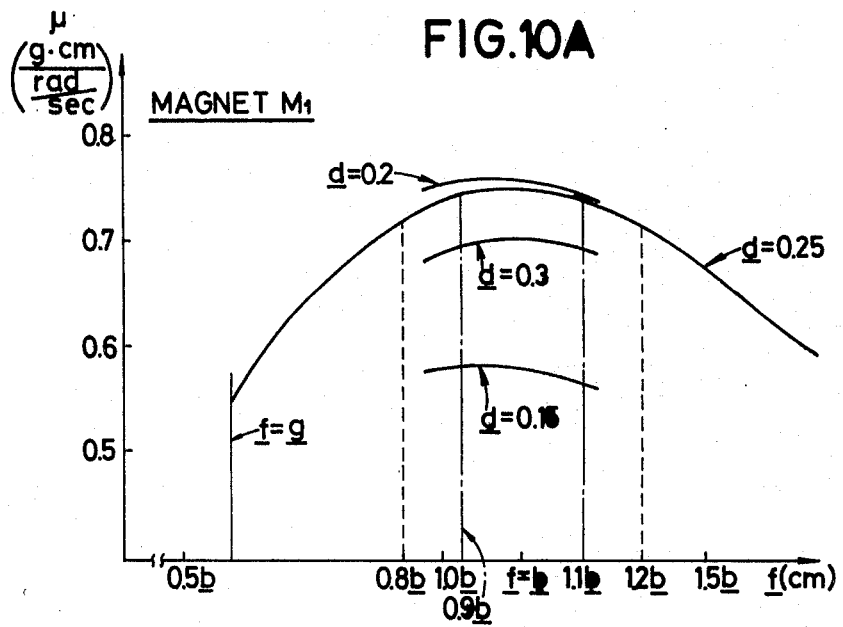
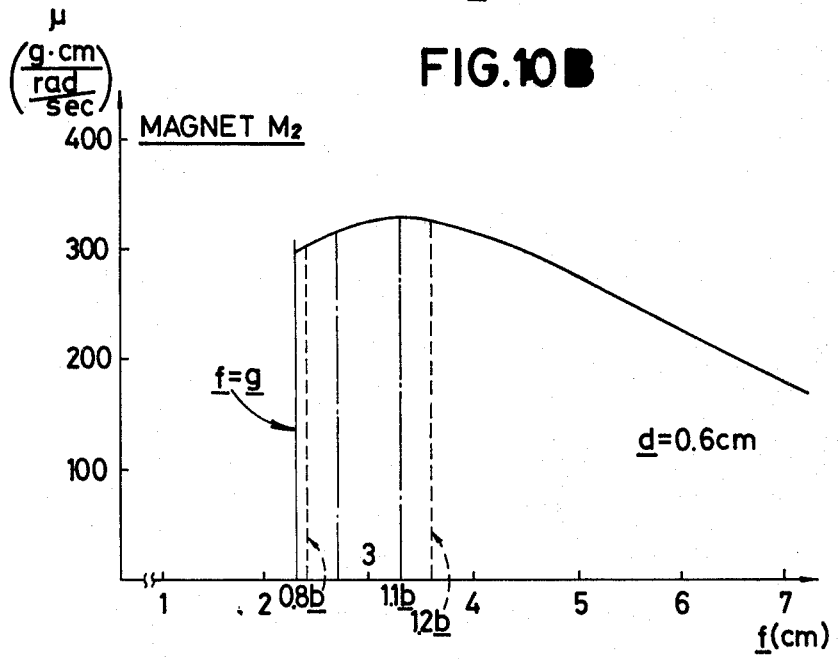

DC MOTOR

BACKGROUND OF THE INVENTION

This invention relates to a DC motor, and more particularly, to a flat brushless DC motor in which the rotor includes a field magnet and the stator includes a coil located in a plane parallel to and opposing the lower surface of the magnet.

It is generally known that the torque-angular velocity characteristic of a DC motor is of a "dropping" nature, that is, the generated torque of the motor decreases with increasing angular velocity. If a mechanical viscosity factor $\mu$ is defined as the reciprocal of the slope of the torque-angular velocity characteristic cirve, a DC motor having a large mechanical viscosity factor $\mu$ will generally be superior in performance. Thus, for example, a DC motor having a large mechanical viscosity factor $\mu$, will have superior speed control, that is, it will take less time for the motor to change from one speed to another due to load variations. In addition, a motor having a higher value of $\mu$ will produce a larger torque and thus be more powerful. Further, the working current and, consequently, the consumed electric power for a given drive voltage, can be reduced by increasing the value of $\mu$. Accordingly, a motor having a large value of $\mu$ has enhanced operating characteristics.

However, DC motors of the described type have generally been designed by a trial and error method and no attempts have been made to accurately increase the mechanical viscosity factor $\mu$ to optimize the operating characteristics of the motor. Thus, these DC motors are typically quite inefficient in operation.

OBJECTS AND SUMMARY OF THE INVENTION

Accordingly, it is an object of this invention to provide a DC motor that avoids the above-described difficulties encountered with the prior art.

More particularly, it is an object of this invention to provide a DC motor in which the mechanical viscosity factor $\mu$ is maximized for a rotor magnet of specified diemsions.

Another object of this invention is to provide a DC motor which has its mechanical viscosity factor $\mu$ maximized by selecting the reduced air gap distance d' of the motor and the mean radial distance f of the coil to be within respective ranges.

Still another object of this invention is to provide a DC motor which has superior speed control, and is relatively powerful and economical in its consumption of electric power.

In accordance with an aspect of this invention, a DC motor includes a field magnet having a radially directed annular surface and at least one coil element in the form of a loop disposed in a plane parallel to such annular surface, with the loop having circumferentially extending portions which are in inner and outer relation in respect to the center of the annular surface. The magnet and each coil element are relatively rotatable about an axis through the center of the annular magnet surface. Moreover, the mean radial distance f between the inner and outer circumferentially extending portions of each coil element, and the radial width b of the annular surface of the magnet are selected so that the ratio b/f is within the range of 0.8 to 1.2.

It is a further feature of the invention that a reduced air gap d' of the motor is within the range of 0.15 to 0.30, with such reduced air gap being defined as $d' = \sqrt{2}d/\sqrt{ab}$, in which d is the size of the air gap between the annular magnet surface and the stator on which each coil element is mounted and a is the mean radius of the magnet.

The above, and other objects, features and advantages of the invention, will be apparent from the following detailed description of illustrative embodiments of the invention which are to be read in conjunction with the accompanying drawings.

BRIEF DESCRIPTION OF THE DRAWINGS

FIG. 8A and 8B are graphs showing the relationship between the size of the air gap d and the mechanical viscosity factor $\mu$ for two magnets having different dimensions;

FIGS. 10A to 10D are graphs showing the relationship between the mean radial distance f of the coil and the mechanical viscosity factor $\mu$, for four magnets having different dimensions.

DESCRIPTION OF THE PREFERRED EMBODIMENT

Figure 1:
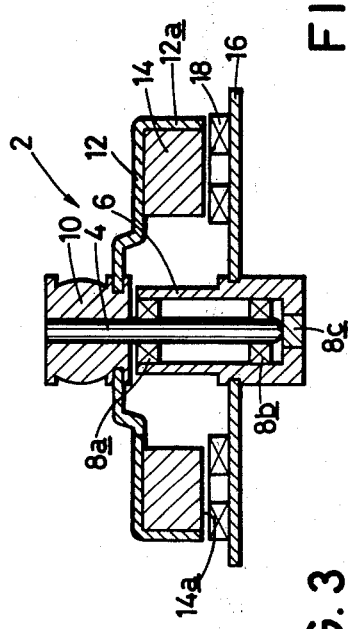
FIG. 1 is a cross-sectional view of a known brushless DC motor driven by a two-phase alternating current.

Referring to the drawings in detail, and initially to FIG. 1 thereof, a known brushless DC motor 2 is shown which is adapted to be driven by a two-phase alternating current. Motor 2 includes a motor drive shaft rotatably supported in a cylindrical shaft support 6 by bearings 8a, 8b and 8c. A pulley 10 is secured to the upper end of shaft 4 for transmitting torque therefrom in a known manner and a disc-like rotor 12 having a peripheral skirt 12a is attached to, and circumferentially surrounds an end portion of pulley 10. An annular or ring-shaped permanent magnet 14 having a rectangular cross-sectional configuration and a radially directed lower annular surface 14a is secured to the underside of rotor 12 by any suitable means, such as bonding, so that annular surface 14a is in a plane orthogonal to the axis of motor shaft 4. Magnet 14 preferably has a plurality of magnetic poles, for example, eight poles of alternating polarities. Also, a circular plate-like stator yoke 16 is fixed to the outer circumferential surface of shaft support 6 and has a driving coil 18 mounted on the upper surface thereof in a plane parallel to annular surface 14a.

Figure 2:
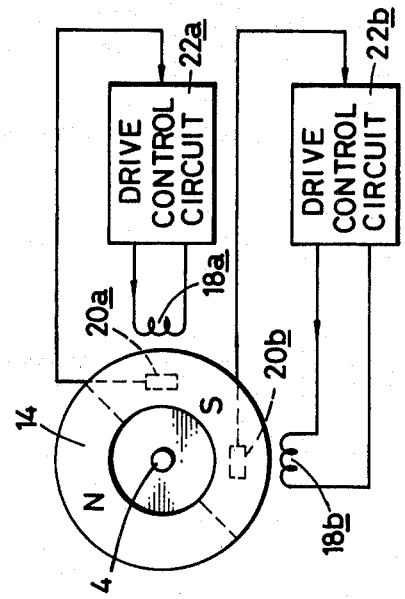
FIG. 2 is a circuit diagram for driving the motor of FIG. 1.

FIG. 2 shows a circuit arrangement that can be utilized with the motor of FIG. 1, in which coil 18 is comprised of two phase coil elements 18a and 18b arranged at a phase difference of $N\pi/2$ electrical degrees, where N is an odd number, and in which magnet 14 has a magnetization so that the intensity of the magnetic flux therefrom changes in a sinusoidal manner along any circumferential path. Sensing elements, such as Hall effect elements 20a and 20b, are arranged on stator yoke 16 in the same phase relation as coil elements 18a and 18b or at a phase difference of $N'2\pi$ electrical degrees therefrom, where N' is an integer, for sensing the rotational position of magnet 14 and generating driving signals which are proportional to the intensity of the magnetic flux interlinked with coil elements 18a and 18b, respectively. The driving signals from elements 20a and 20b are supplied to drive control circuits 22a and 22b, respectively, which in turn, supply sinusoidal drive currents, proportional to the flux linkage, to coil elements 18a and 18b. Coil elements 18a and 18b are thereby excited in the proper phase to produce a rotating magnetic field which develops a torque in a given direction on magnet 14, whereby rotor 12 and pulley 10, secured to magnet 14, are urged to rotate. The value of the torque is dependent upon the intensity of the driving current and flux linkage, and is thereby proportional to $\sin^2\phi$ and $\cos^2\phi$, respectively, where $\phi$ is the rotational angle of rotor 12. Thus, since $\sin^2\phi + \cos^2\phi = 1$, the total torque is constant regardless of the rotational angel of rotor 12 and a torque having little ripple and noise is produced.

Figure 3:
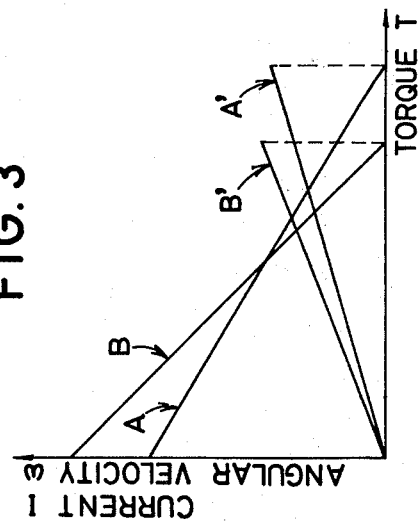
FIG. 3 is a graph showing the general characteristics of the brushless DC motor of FIG. 1.

Referring now to FIG. 3, it will be seen that the torque-angular velocity characteristics (static characteristics) for two different brushless DC motors of the type described with reference to FIG. 1 are represented by curves A and B, and that the torque-operating current characteristics of such motors are represented by curves A' and B'. As shown on FIG. 3, the torque-angular velocity characteristic is of a "drooping" nature, that is, the angular velocity increases with decreasing torque generated by motor 2. This means that the motor has a certain viscous resistivity. In this regard, a mechanical viscosity factor $\mu$ is defined as $\Delta T/\Delta w$ (g.cm/rad/sec), and is represented by the reciprocal of the slope of the torque-angular velocity characteristic A or B.

It is generally known that, by increasing the value of the mechanical viscosity factor $\mu$, the operating characteristics of a DC motor are enhanced. Thus, since the slope of the torque-angular velocity characteristic decreases with increasing values of $\mu$, it is readily seen that a DC motor having the torque-angular velocity characteristic of curve A is, for example, superior to a DC motor having the characteristic of curve B. Since the effect of load variation on motor speed decreases with increasing values of $\mu$, the motor represented by curve A has superior speed control over the motor represented by curve B. This can be seen more readily as follows:

If the moment of inertia of a motor having a load applied thereto is represented by $J_m$, the time constant $\tau$ within which the motor achieves its steady-state angular velocity can be expressed by the equation, $\tau = J_m/\mu$, where $\mu = T_O/w_O$ and $w_O$ is the steady-state angular velocity of the motor for a fixed current applied to Hall effect elements 20a and 20b. It is thus seen that time constant $\tau$ decreases with increasing values of $\mu$, that is, it takes less time for the motor to reach its desired speed $w_O$. This same effect occurs when the load applied to the motor is reduced to thereby reduce the value of $J_m$.

Thus, for a motor having a fixed value of $\mu$, the time within which the motor changes its angular speed due to load variations is expressed by the equation $\Delta \tau = \Delta J_m/\mu$. From this equation, it is readily seen that, for a given load variation $\Delta J_m$, a motor having a higher value of $\mu$ will be able to change its angular speed in a shorter amount of time. Accordingly, for any given load variation, a motor having the torque-angular velocity characteristic represented by curve A has a speed control which is superior to that of a motor with the characteristic represented by curve B.

Further, since $\mu = T/w$ for a given speed, a motor having a higher value of $\mu$ (curve A) produces a larger torque, and is thus more powerful, than a motor with a lower value of $\mu$ (curve B), for any given speed. In addition, the working current and, consequently, the consumed electric power for a given drive voltage, can be reduced by increasing the value of $\mu$, as shown by curves A' and B' of FIG. 3. Accordingly, it is seen that a motor having a large value of $\mu$ has enhanced operating characteristics. However, DC motors of the type described above have generally been designed only by a trial and error method and no provisions have been made for accurately maximizing the mechanical viscosity factor $\mu$ for motors having field magnets of equivalent dimensions.

Figure 4:
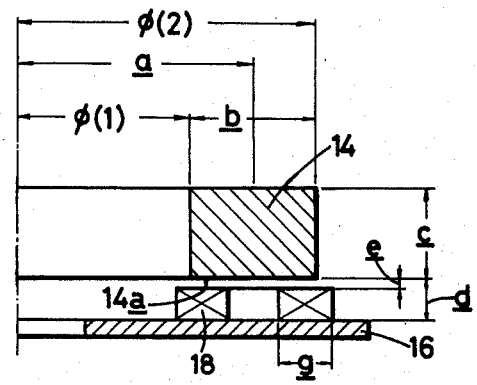
FIG. 4 is a cross-sectional view of a portion of a magnet and coil for illustrating the dimensions thereof and the relationship therebetween according to one embodiment of this invention.
Figure 5:
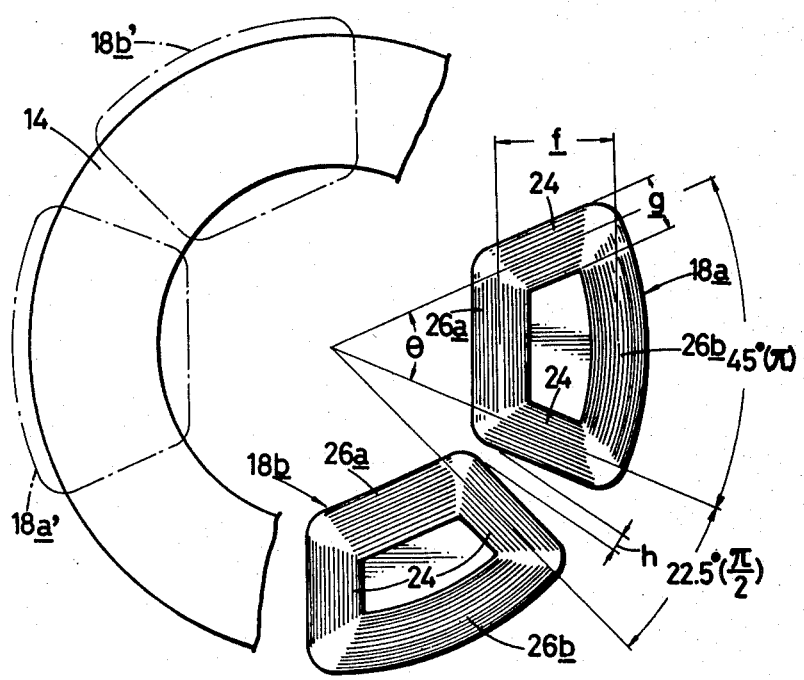
FIG. 5 is a partly broken away, plan view of the magnet and coil elements according to the embodiment of FIG. 4, and in which the dimensions of the coil elements are shown.

Referring now to FIGS. 4 and 5, there are illustrated therein portions of a brushless DC motor to which reference will be made in describing the improvement of this invention, and in which elements corresponding to those described above with reference to the known DC motor of FIG. 1 are identified by the same reference numerals. In FIG. 4, the mean radius of annular permanent magnet 3 is represented by the letter a, the radial width of annular surface 14a of the magnet is represented by the letter b, and the axial thickness is represented by the letter c. An air gap of size d is disposed between annular surface 14a of magnet 14 and the upper surface of stator yoke 16, and the distance between annular surface 14a and the upper surface of coil 18 is represented by the letter e.

In FIG. 5, coil elements 18a and 18b are shown to have a sectorial loop configuration, but any other suitable loop configuration such as a circular or oblong configuration, can be used. Each of coil elements 18a and 18b consists of a pair of radial portions 24 angularly spaced apart by a central pitch angle $\theta$ which corresponds approximately to an electrical angle of $\pi$, and a pair of circumferentially extending portions 26a and 26b which are respectively in inner and outer relation in respect to the center of annular surface 14a and which are separated from each other by a mean radial distance f. Each coil element 18a and 18b has a winding width g and there is a spacing h between adjacent coil elements. Also, coil elements 18a and 18b are positioned so as to have a phase difference of $3\pi/2$ electrical degrees. Preferably, motor 2 includes additional coil elements 18a' and 18b' which are shown in dot-dash lines on FIG. 5 to be circumferentially positioned 180° apart from and serially connected with coil elements 18a and 18b, respectively.

The improvement according to this invention resides in the maximization of the mechanical viscosity factor $\mu$ for a magnet of specified dimensions. More particularly, it has been found that the mechanical viscosity factor $\mu$ can obtain a desired maximum value when the ratio of the radial width b of annular surface 14a of magnet 14 to the mean radial distance f of coil elements 18a and 18b, that is, b/f, is within the range of 0.8 and 1.2. The value of the mechanical viscosity factor is also at a maximum when the size of the reduced air gap d' $(=\sqrt{2}d/\sqrt{ab})$ is between 0.15 and 0.3. The basis for the foregoing will now be described in greater detail.

Generally, a torque T applied to a conductor of a coil element in a DC motor of the type described above, can be expressed by the following equation:

$$T = F \times R = B \times l \times I \times R \qquad (1),$$

in which F represents a force acting on the conductor, l the length of the conductor, R the mean radius of rotation of the conductor, I the current flowing through the conductor, and B the magnetic flux density in the air gap adjacent the conductor. If the relative angular velocity of the conductor is represented by $\omega$, the conductor moves at a speed of $R\omega$ in the magnetic field. As a consequence thereof, a voltage E is generated in the conductor, which can be expressed by the following equation:

$$E = B \times l \times R \times \omega \qquad (2).$$

A reverse voltage factor $K_v$ can then be defined as:

$$K_v = E/\omega \qquad (3).$$

However, it is to be noted that the magnetic flux effectively interlinked with the conductors is typically less than such flux linkage in the ideal situation, with the amount of reduction of flux linkage depending on the shape of the coil element utilized. It is therefore necessary, in practical usage, to define an interlinkage correction factor $\alpha$ as the ratio of effective flux linkage to ideal flux linkage.

For example, it has previously been stated that coil elements 18a and 18b have a winding width g along their inner and outer circumferentially extending portions 26a and 26b. However, the corner sections of the coil elements, which are also parts of their circumferentially extending portions, are disposed at predetermined angles with respect to corresponding tangents to magnet 14 at its periphery. Since magnet 14 is magnetized in a sinusoidal manner along any circumferential path thereof, the magnetic flux density B is not uniform for coil elements 18a and 18b because of the corner sections thereof. Accordingly, a correction factor $\alpha'$, which depends on the shape of the coil elements, must be utilized to obtain the mean magnetic flux density $B \times \alpha'$ acting on each coil element of winding width g. Correction factor $\alpha'$ is expressed as a function of g and r, where r represents a radial distance of the motor. In the same manner, since torque is generated at right angles to the direction of the magnetic flux and conductor current, the torque (in the tangential direction) is reduced at the corner sections of the coil elements because of the reduction of the effective interlinked magnetic flux thereat. Thus, a second correction factor $\alpha''$ is formulated in the same manner as above. The correction factors $\alpha'$ and $\alpha''$ can then be combined into one correction factor $\alpha(g,r)$, in which $0 \leq \alpha \leq 1$. Accordingly, equation (3) for the reverse voltage factor $K_v$ should be modified as follows:

$$K_v = B \times l \times N \times \alpha \times R \qquad (4),$$

in which N is the total number of conductors making up the coil and in which the equivalent value for E from equation (2) has been substituted therefor in equation (3).

The motor output $T\omega$ must be equal to the electric power EI consumed by the motor, less negligible friction losses. Therefore, for all practical purposes:

$$T\omega = EI \qquad (5),$$

and, if the wound wire resistance of the conductor is represented by $R_m$, the following equation is obtained:

$$R_m = E/I \qquad (6).$$

If equations (3), (5) and (6) are combined, and the correction factor $\alpha$ is neglected, the mechanical viscosity factor $\mu$ can then be expressed as follows:

$$\mu = T/\omega = K_v^2/R_m \qquad (7).$$

It is to be further noted that the value of the magnetic flux density B used in equations (1), (2) and (4) has generally been considered to be substantially constant in the proximity of the conductors. However, it has been found that this value changes in the radial direction of the motor. More particularly, when the size of the air gap d between stator yoke 17 and permanent magnet 14 is small, the magnetic flux density B changes in the manner shown by curve H in FIG. 6, so as to be substantially uniform in the proximity of the conductors. However, as the size of the air gap d increases, the distribution of density B spreads in the radial direction of the motor as shown by curve I in FIG. 6. Such increased air gap size d thereby results in an increase in the magnetic flux leakage coefficient F and a decrease in the maximum flux density $B_m$.

Because it is difficult to calculate the maximum flux density $B_m$ from the shape and material of magnet 14, the air gap d and the remanence $B_r$, the relation between the maximum flux density $B_m$ and the air gap size d was determined experimentally. This was done using several ferrite magnets having the shape shown on FIG. 4, and the maximum densities $B_m$ were measured at different air gap sizes or lengths d.

Figure 7:
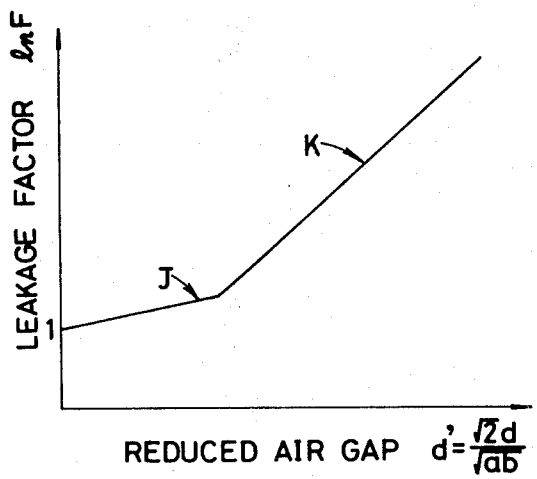
FIG. 7 is a graph showing the relationship between the magnetic flux leakage coefficient F and the reduced air gap d'.

The leakage factor or coefficient F can be calculated from the below equation:

$$F = B_r/B_m - \mu m \cdot d/c \qquad (8),$$

in which $\mu m$ is the permeability of the magnet. Thus, the leakage factor F can be calculated from equation (8) using the measured values of $B_m$ for various values of d, with the values of $B_n$, $\mu m$ and c being constant for a particular magnet. The calculated values of the leakage factor are shown on the graph of FIG. 7 in which the ordinate is a losarithmic scale lnF (of the leakage factor) and the abscissa represents the reduced air-gap length $d' = \sqrt{2}d/\sqrt{ab}$ which depends on the shape of the magnet. It is seen from FIG. 7 that the approximate value of the leakage coefficient or factor F is obtained from curve J when the length or size of the reduced air gap d' is small. This value of the leakage factor F from curve J approximates the value obtained by known analytical methods for calculating the permeance in dependence on the configuration of the magnet. However, in DC motors of the type described with reference to FIGS. 4 and 5, the reduced air gap d' is generally larger than that obtained at the junction of curves J and K so that the approximate value of the leakage factor F must be obtained from curve K in FIG. 7. An experimental formula for F(d') is obtained from curve K in FIG. 7. The maximum flux density $B_m$ can be calculated in terms of F(d') by transforming equation (8) as follows:

$$B_m = \frac{B_r}{F(d') + \mu_m d/c} \qquad (9).$$

Figure 6:
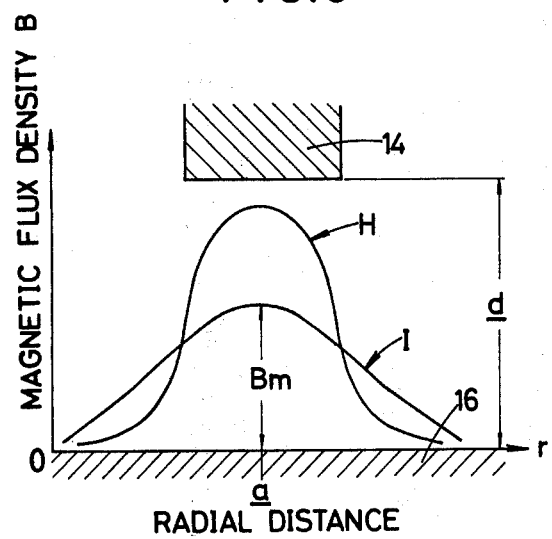
FIG. 6 is a graph showing the distribution in the radial direction of the motor of FIGS. 4 and 5, of the magnetic flux density B in the air gap d.

As previously described with reference to FIG. 6, when the size of air gap d is small, the magnetic flux density B can be considered, for all practical purposes, to be uniform in the air gap and equivalent to the maximum flux density $B_m$ calculated from equation (9). However, as the size of air gap d increases, the flux density B decreases at the radial extremities or inner and outer peripheries of annular magnet 14, as shown by curve I of FIG. 6. It is thus possible to represent the magnetic flux density in the air gap d by a suitable two-dimensional distribution function in which it is assumed that the magnetic changes are uniformly distributed on annular surface 14a of magnet 14, and in which the distribution function includes, as a parameter thereof, the maximum magnetic flux density $B_m$ determined from equation (9). Accordingly, for a magnetic 14 with specified or fixed dimensions, the magnetic flux density B in the air gap can be expressed as a function B(d, r).

Thus, the reverse voltage factor $K_v$ from equation (4) can now be represented by the sum of $\Delta K_v$ with respect to a small length $\Delta l$ of the conductor at a radium $r_n$:

$$K_v = \xi \Delta K_v = N \overset{n}{\underset{\xi}{}} B_n(d, r_n) \cdot \alpha n(g, r_n) \cdot r_n \cdot \Delta l \qquad (10).$$

Also, the wound wire resistance $R_m$ of equation (6) can be expressed as follows:

$$R_m = N^2 L / S \qquad (11),$$

in which l is the resistivity of the wire, N is the number of turns of wire (number of conductors making up the coil), L is the mean length of one turn and S is the effective cross-sectional area of the wire. Combining equations (7), (10) and (11), the mechanical viscosity factor $\mu$ can be expressed as follows:

$$\mu = \frac{s}{\rho l} \{ \overset{n}{\underset{\xi}{}} B_n(d, r_n) \cdot \alpha(g, r_n) \cdot \zeta n \cdot \Delta l \}^2 \qquad (12).$$

In this equation, the value of S is determined from the air gap size d, the distance e between annular surface 14a and the upper surface of coil 18, and the winding width g, and the value of L is determined from the mean radial distance f, the coil width g and the pitch angle $\theta$, the correction factor $\alpha n$, which corresponds to changes in shape of the coil elements, is also dependent on such dimensions. Accordingly, the mechanical viscosity factor $\mu$ can be calculated from the geometrical dimensions (d, e, f, g, $\theta$), independent of the coil specifications, such as diameter of the wire or the number of turns.

In practice, the distance e between annular surface 14a and the upper surface of coil 18, is set to a predetermined small value with the only condition being that magnet 14 and coil 18 do not contact each other. For example, the relationship between e and d can be e = 0.05 + 0.15d, in order to provide a satisfactory value of e. Further, pitch angle $\theta$ is determined by the number of magnetic poles provided on magnet 14, and the spacing h between adjacent coil elements 18a and 18b is set to minimum value consistent with available manufacturing accuracy and the electrical insulation being used. The winding width g is typically determined from the pitch angle $\theta$ and coil spacing h. Given a magnet with specified dimensions, it is readily observable that $\alpha n$ and L are merely dependent on the mean radial distance f, and S and $B_n$ are dependent on the size of air gap d. Accordingly, changes in the mechanical viscosity factor $\mu$ calculated from equation (12) with respect to two permanent magnets $M_1$ and $M_2$ having different dimensions. The dimensions $\theta(1)$, $\theta(2)$ and c of magnet $M_1$ are 45 mm, 22 mm, 7 mm, respectively, while those of magnet $M_2$ are 160 mm, 100 mm, 15 mm, in which $\theta(1)$ is the outer diameter $\theta(2)$ is the inner diameter, and c is the axial thickness of the magnet. Thus, it is seen that the dimensions a and b for magnets $M_1$ and $M_2$ can be calculated as a = 16.75 mm and b = 11.5 mm for $M_1$, and a = 65 mm and b = 30 mm for $M_2$. When the size of air gap d is small, the cross-sectional area S of the coil can be large, resulting in a small mechanical viscosity factor $\mu$ which increases with increasing values of d. However, when the air gap length d exceeds a certain value, the magnetic flux density $B_n$, and consequently, the mechanical viscosity factor $\mu$, decreases. Therefore, as shown in FIGS. 8A and 8B, mechanical viscosity factor $\mu$ reaches a maximum value at a certain air gap length d.

Figure 9:
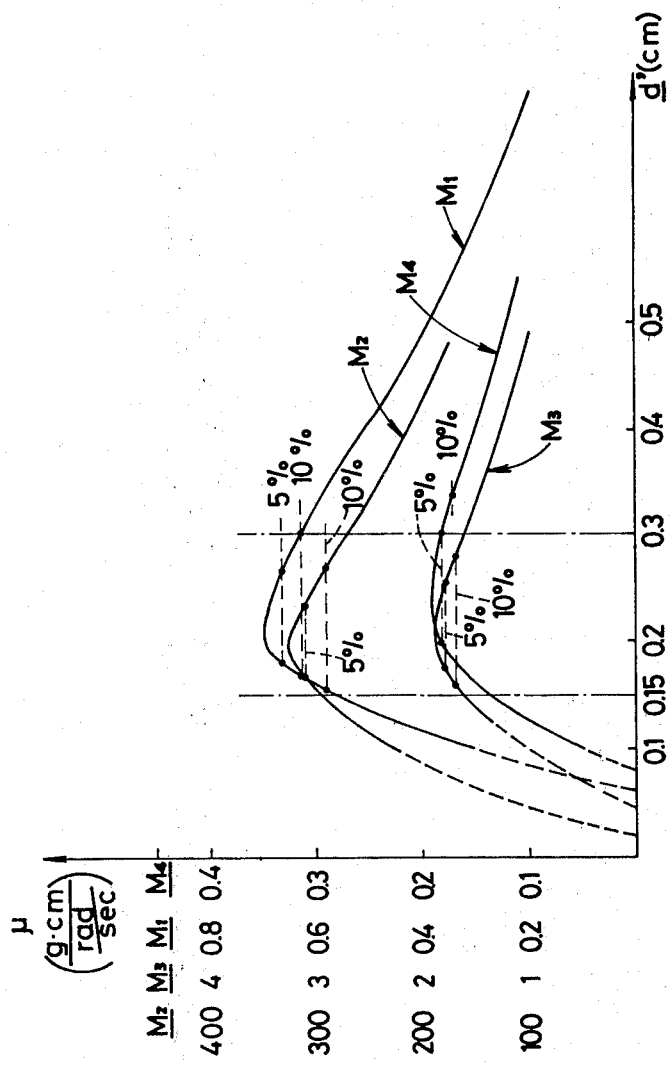
FIG. 9 is a graph showing the relationship between the mechanical viscosity factor $\mu$ and the reduced air gap d' for four magnets having different dimensions.

In like manner, as shown in FIG. 9, the mechanical viscosity factor $\mu$ reaches a similar peak value as a function of d' (= $\sqrt{2}d/\sqrt{ab}$) for magnets $M_1$–$M_4$, in which the dimensions $\theta(1)$, $\theta(2)$ and c for magnets $M_3$ and $M_4$ are 55 mm, 25 mm, 7 mm and 37 mm, 25 mm, 5 mm, respectively. As clearly seen in FIG. 9, the mechanical viscosity factor $\mu$ is at a maximum value when d' is within the range from 0.15 to 0.30, that is, $0.15 \leq d' \leq 0.3$. Within such range, the deviation of factor $\mu$ from its maximum value is only approximately five to ten percent. Thus, after the magnet dimensions a and b have been chosen, the calculation of an optimum air gap distance d, such that d' is within the above specified range, will result in a maximum value of $\mu$.

Once the mechanical viscosity factor $\mu$ is calculated, and the working voltage $E_o$, torque $T_o$ and angular velocity $\omega_o$ are determined, the working current $I_o$ and reverse voltage factor $K_v$ can be calculated on the basis of equations (3) and (5)–(7). As seen from FIG. 8A, which also illustrates the relationship between working current $I_o$ and air gap d, the working current $I_o$ decreases as the mechanical viscosity factor $\mu$ increases. In other words, the consumed electric power for the motor can be reduced by increasing the mechanical viscosity factor $\mu$. It is to be noted that, because of the influence of iron loss (hysteresis loss and eddy current loss), the size of air gap d at which the mechanical viscosity factor $\mu$ is at a maximum, does not coincide with the size of air gap d at which the working current $I_o$ is at a minimum. However, for all practical purposes, such difference is insignificant. In any case, such iron loss should be taken into consideration in determining the value used for $T_o$. Once $I_o$ and $K_v$ are obtained, the wound wire resistance $R_m$ can be calculated from equation (1).

Figure 10C:
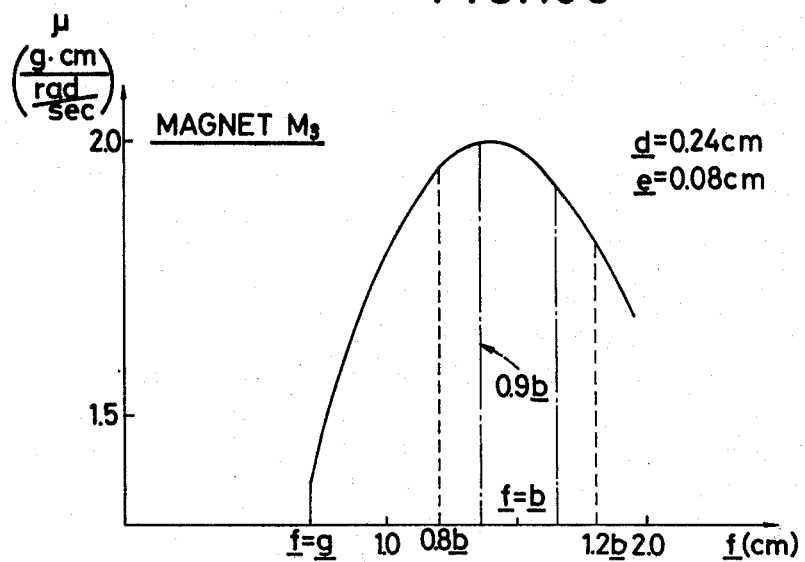
Figure 10D:
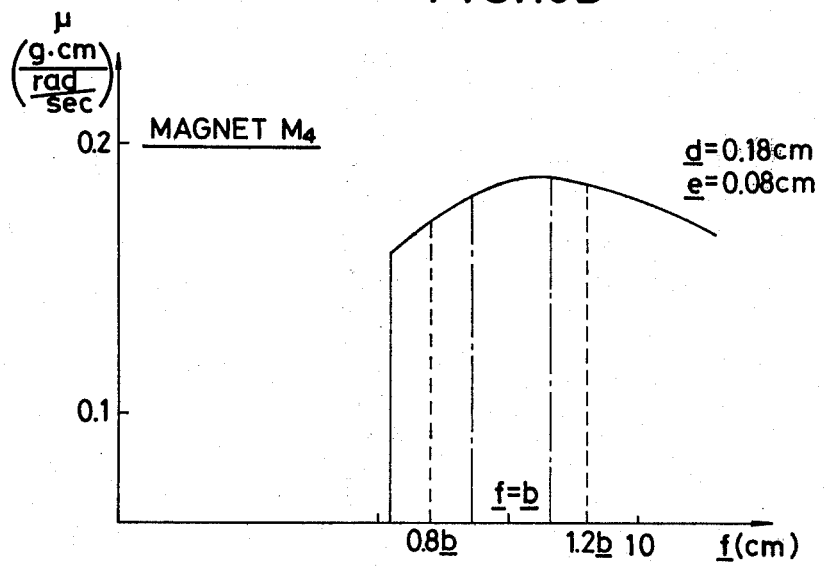

Referring now to FIGS. 10A to 10D, in which the relationships between the mean radial distance f of coil elements 18a and 18b and the mechanical viscosity factor $\mu$ are shown for magnets $M_1$ to $M_4$, respectively, it will be noted that, in each case, the mechanical viscosity factor $\mu$ was calculated from equation (12). In FIG. 10A, changes in the mechanical viscosity factor $\mu$ are shown for air gaps of different lengths d, while in FIGS. 10B, 10C and 10D, changes in the mechanical viscosity factors $\mu$ are shown for an air gap having a fixed size or length d. It will be understood from FIGS. 10A to 10D that the mechanical viscosity factor $\mu$ reaches a maximum value at a certain mean radial distance f of coil elements 18a and 18b, that is, when the value of f is within the range of $0.8 \times b$ to $1.2 \times b$. The mechanical viscosity factor $\mu$ can thus be satisfactorily large so long as dimension f of each coil element is within 20% of the radial width b of the annular surface of the magnet, or in other words, $0.8 \leq f/b \leq 1.2$. Accordingly, a satisfactory mechanical viscosity factor $\mu$ can be obtained under the conditions of $0.15 \leq d' \leq 0.3$ and/or $0.8 \leq f/b \leq 1.2$ and a motor having such mechanical viscosity factor $\mu$ has superior operating characteristics.

It is to be noted that this invention is not limited to the described two-phase DC motor, but may be utilized with a flat brushless DC motor of the switching type in which plural (for example, three-phase) coil elements are sequentially energized in accordance with rotor position detecting signals supplied thereto. Further, this invention may be utilized with a brushless DC motor in which the stator is comprised of a field magnet, and the rotor includes the coil and a position-detecting magnet, and further in which a sinusoidal drive current is supplied through a slip ring to the coil on the basis of detecting signals obtained from a position-detecting element positioned on the stator.

Having described specific embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a DC motor including a field magnet having a radially directed annular surface, and at least one coil element in the form of a loop disposed in a plane parallel to said surface, said loop having circumferentially extending portions which are in inner and outer relation in respect to the center of said annular surface, said magnet and each said coil element being relatively rotatable about an axis through said center of the annular surface; the improvement comprising providing each said coil element with a mean radial distance f between said inner and outer circumferentially extending portions which is related to the radial width b of said annular surface of the magnet so that the ratio b/f is within the range of 0.8 to 1.2.

2. A DC motor according to claim 1; in which said motor further includes a supporting means, a rotor rotatably supported by said supporting means and in axial alignment with said axis through said center of the annular surface, and a stator means secured to said supporting means.

3. A DC motor according to claim 2; in which said magnet is secured to said rotor and said at least one coil element is secured to said stator means.

4. A DC motor according to claim 3; in which said motor includes two coil elements positioned on said stator means at a phase difference of $N\pi/2$ electrical degrees, where N is an odd integer.

5. A DC motor according to claim 4; in which said motor further includes sensing elements positioned on said stator means in a phase relation to said coil elements of $N'2\pi$ electrical degrees, where N' is an integer.

6. A DC motor according to claim 5; in which a magnetic flux is interlinked between said coil elements and said magnet and in which said sensing elements supply rotor positioning signals to said coil elements which are proportional to the interlinked magnetic flux for imparting a torque to said rotor.

7. A DC motor according to claim 6; in which said motor includes a drive circuit to which said rotor positioning signals are applied for supplying a sinusoidally varying drive signal to said coil elements, and said magnet is circumferentially magnetized along said annular surface thereof in a sinusoidally varying manner.

8. A DC motor according to claim 7; in which said magnet has a plurality of poles of alternating polarities.

9. A DC motor according to claim 1; in which each said coil element is in the form of a loop of a sectorial configuration.

10. In a DC motor including a field magnet having a radially directed annular surface, stator means, and at least one coil element in the form of a loop secured to said stator means and disposed in a plane parallel to said surface, said magnet and each said coil element being relatively rotatable about an axis through said center of the annular surface; the improvement comprising providing the motor with a reduced air gap $d' = \sqrt{2}d/\sqrt{ab}$ within the range of 0.15 to 0.30, in which d is the length of an air gap between said annular surface and said stator means, a is a mean radius of said annular surface, and b is the radial width of the magnet.

11. A DC motor according to claim 10; in which said motor further includes a supporting means and a rotor rotatably supported by said supporting means and in axial alignment with said axis through said center of the annular surface, and said stator means is secured to said supporting means.

12. A DC motor according to claim 11; in which said magnet is secured to said rotor.

13. A DC motor according to claim 12; in which said motor includes two coil elements positioned on said stator means at a phase difference of $N\pi/2$ electrical degrees, where N is an odd integer.

14. A DC motor according to claim 13; in which said motor further includes sensing elements positioned on said stator means in a phase relation to said coil elements of $N'2\pi$ electrical degrees, where N' is an integer.

15. A DC motor according to claim 14; in which a magnetic flux is interlinked between said coil elements and said magnet, and in which said sensing elements supply rotor positioning signals to said coil elements which are proportional to the interlinked magnetic flux for imparting a torque to said rotor.

16. A DC motor according to claim 15; further including a drive circuit to which said rotor positioning signals are applied for supplying a sinusoidally varying drive signal to said coil elements; and in which said magnet is circumferentially magnetized along said annular surface thereof in a sinusoidally varying manner.

17. A DC motor according to claim 10; in which said magnet has a plurality of poles of alternating polarities.

18. A DC motor according to claim 10; in which each said coil element is in the form of a loop of a sectorial configuration.

19. In a DC motor including a field magnet having a radially directed annular surface, stator means, and at least one coil element in the form of a loop secured to said stator means and disposed in a plane parallel to said annular surface, said loop having circumferentially extending portions which are in inner and outer relation in respect to the center of said annular surface, said magnet and each said coil element being relatively rotatable about an axis through said center of the annular surface; the improvement comprising providing each said coil element with a mean radial distance f between said inner and outer circumferential extending portions which is related to the radial width b of said annular surface of the magnet so that the ratio b/f is within the range of 0.8 to 1.2; and further providing a reduced air gap $d' = \sqrt{2}d/\sqrt{ab}$ within the range 0.15 to 0.30, and in which a is a mean radius of said annular surface and d is the length of an air gap between said annular surface and said stator means.

* * * * *